United States Patent [19]

Counts

[11] Patent Number: 5,192,854
[45] Date of Patent: Mar. 9, 1993

[54] SYSTEM FOR ELECTRONICALLY RECORDING AND REDEEMING COUPONS

[76] Inventor: Reginald D. Counts, 1714 Legend La., St. Louis, Mo. 63146

[21] Appl. No.: 829,561

[22] Filed: Feb. 5, 1992

Related U.S. Application Data

[63] Continuation of Ser. No. 558,775, Jul. 26, 1990, abandoned.

[51] Int. Cl.⁵ .......................... G06F 7/20; G06F 15/74
[52] U.S. Cl. ..................................... 235/375; 235/381
[58] Field of Search .............. 235/375, 376, 381, 382, 235/383, 385, 472; 364/402, 404, 405

[56] References Cited

U.S. PATENT DOCUMENTS

| | | | |
|---|---|---|---|
| 4,071,740 | 1/1978 | Gogulski | 235/432 X |
| 4,373,133 | 2/1983 | Clyne et al. | 235/385 |
| 4,554,446 | 11/1985 | Murphy et al. | 235/385 |
| 4,879,540 | 11/1989 | Ushikubo | 235/385 |
| 4,882,675 | 11/1989 | Nichtberger et al. | 235/493 |
| 4,896,791 | 1/1990 | Smith | 235/381 |
| 4,929,819 | 5/1990 | Collins, Jr. | 235/383 |
| 5,008,519 | 4/1991 | Cunningham et al. | 235/383 |
| 5,047,614 | 9/1991 | Bianco | 235/385 |

FOREIGN PATENT DOCUMENTS

| | | |
|---|---|---|
| 63-149774 | 6/1988 | Japan . |
| 1-205296 | 8/1989 | Japan ............................ 235/383 |

Primary Examiner—John W. Shepperd
Assistant Examiner—Edward H. Sikorski
Attorney, Agent, or Firm—Longacre & White

[57] ABSTRACT

An electronic coupon system handles coupons selected by a customer. The coupons have a product code of the product covered by the coupon and have a corresponding coupon code representing information relating to the value of the coupon. A coupon scanner used by the customer scans the coupons and has a memory for storing data representing the scanned product codes and their corresponding coupon codes. A product scanner at a retail store scans product codes of products to be purchased and provides data representing the scanned codes. A processor credits to the customer the value of the coupon when the data representing the scanned codes corresponds to the data in the coupon scanner memory. The system may also include a kiosk having a processor interfacing with the coupon scanner for providing to the scanner additional data and for providing to the kiosk information stored in the coupon scanner.

3 Claims, 10 Drawing Sheets

SYSTEM FOR ELECTRONICALLY RECORDING AND REDEEMING COUPONS

This is a continuation of application Ser. No. 07/558,775, filed Jul. 26, 1990, which was abandoned upon the filing hereof.

BACKGROUND OF THE INVENTION

This invention generally relates to a system for providing purchase incentives, and, in particular, to an electronic system for handling coupons redeemed at the time of purchase of products covered by the coupons. Currently the sequence of events leading up to the redemption of a coupon are as follows. The manufacturer prints a coupon and distributes it. The customer cuts out the distributed coupon, sorts it and stores it with other coupons. Once in the store, the customer searches for the coupon in a stack of coupons of varying size and then searches for the Product covered by the coupon. At the check stand the clerk examines the coupon's expiration date, verifies that the correct product was purchased, and subtracts the coupon's value from the purchase price. The clerk at some point in time performs a preliminary sort of the coupons by manufacturer and tallies them. The coupons are next sent to a clearing house that sorts and tallies all of the coupons for a store and sends them to the manufacturer for redemption. The manufacturer once again sorts and tallies the coupons before performing reimbursement. There is a need for a coupon system which reduces handling of the coupon and is convenient to use.

SUMMARY OF THE INVENTION

It is an object of this invention to provide an electronic coupon system in which the retail store no longer collects thousands of little coupons of various sizes that need to be stored, sorted, tallied, and sent in for redemption; in which the coupon data is simply sorted and sent for redemption either by electronic transmission or on magnetic media; in which the ability to commit coupon fraud is greatly reduced since coupons are only redeemed when a product's UPC is scanned for purchase; and in which the record of redeemed coupons could be protected further through data encryption.

It is another object of this invention to provide an electronic coupon system having a hand-held coupon scanner, a store coupon recorder and a coupon kiosk in which each coupon would include an extended bar code.

It is an object of this invention to provide an electronic coupon system which includes frequent shopper bonuses. The coupon scanner would be able to accrue bonus dollars and/or points for a variety of stores. The customer would be given frequent shopper bonuses to encourage shopping at a particular store. The promotions that can accompany a frequent shopper bonus program are limitless. Redemption of frequent shopper awards or other promotions could be performed at a coupon kiosk at the customer service center to avoid slowing check-out lines.

It is an object of this invention to provide an electronic coupon system which includes manufacturer bonuses. To build brand loyalty a manufacturer could offer bonus points for buying specific products. The bonus points could be redeemed via the coupon kiosk; issuing a coupon or reporting the bonus points to the manufacturer where they could be used like trading stamps toward the purchase of products.

It is an object of this invention to provide an electronic coupon system which includes a payment system. The coupon scanner can also be used as a cash card, debit card, credit card, and check guarantee card. To avoid impeding the flow through the checkout, some of these functions could be performed at a Coupon Kiosk located in the customer service area. Account information for each of the preceding cards can be encoded in a secure manner on the coupon scanner.

The cash card function allows the customer to transfer money between their bank account and the coupon scanner. The coupon scanner could then be used to pay for purchases at the checkout stand. This would shorten the time to complete a purchase by removing the necessity of counting change and avoiding the need to go on-line with a bank as in debit transactions. For debit and credit card transactions the coupon scanner would provide identical functionality.

The check guarantee function can apply both frequency and dollar limits to a variety of check types (personal, payroll, and government).

It is an object of this invention to provide an electronic coupon system which keeps track of demographic information on the shopping patterns of customer's utilizing the system. Each time the coupon scanner is used in a purchase, information about the purchase could be linked to demographic information about the customer providing the retailer and manufacturer with valuable marketing data.

BRIEF DESCRIPTION OF THE DRAWINGS

FIG. 8 is a flow chart according to the invention of the transaction of reporting coupon data by the coupon recorder of FIG. 2 to a remote location.

DETAILED DESCRIPTION OF PREFERRED EMBODIMENTS

Figure 1:
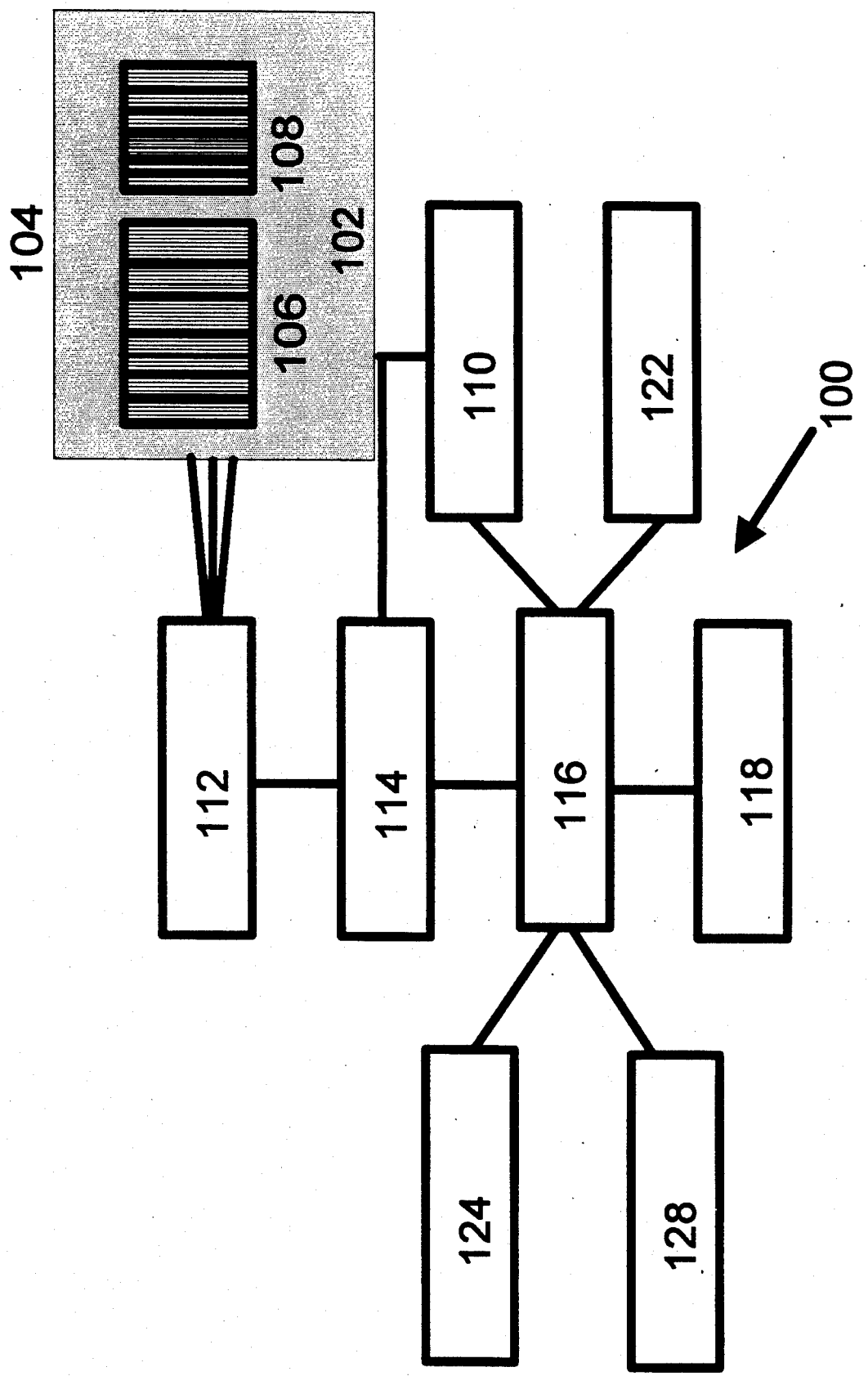
FIG. 1 is a block diagram of a hand-held coupon scanner according to the invention.

Referring to FIG. 1, hand-held coupon scanner 100 is used by the customer to scan and store coupons 102. Each coupon 102 includes an extended UPC bar code 104 or other extended product code having a product code 106 identifying the product covered by the coupon 102 and having a coupon code 108 identifying information relating to the coupon such as value, expiration date, etc. Coupons 102 are stored in the scanner's database memory 110 by scanning the extended UPC bar code 104 printed on the coupon 102. Scanner 112 of the coupon scanner 100 is passed over the coupon's extended UPC bar code 104. Scanner 112 is a standard scanner of the type well know in the prior art. In particular, scanner 112 consists of three parts: the emitter, a lens, and a detector. The emitter is a light source (LED, laser, etc...) that is focused by the lens into a beam appropriate for reading UPC bar codes. The detector 'reads' the levels of light reflected by the bar code as UPC data. Data is passed to the scan decoding circuit which converts it into data that can be processed. The decoder 114 converts the sensed signal into a digital signal representative of the code 104. The decoder 114 translates the reflected light levels from the detector into data that the processor can understand. If the scan is successful, so that a valid digital signal is provided to processor 116 by decoder 144, processor will store the code in memory 110 and activate tone generator 118 to sound a tone and/or activate display 120 or some other indicator to provide a signal. If the scan is not successful, a different tone will be sounded by microprocessor 116 and/or a different signal will be provided to indicate that the scan of the coupon code 104 should be conducted again.

Preferably, the display 120 is a two-line LCD display. The display 120 is used to present information to the customer. This information includes, but is not limited to, messages explaining why a coupon was rejected, whether a coupon is stored in the scanner and its value, the number of bonus points/dollars, and the cash balance on the coupon scanner when it is used as a cash card.

The coupon scanner 100 has two types of memory 110: work area memory, and storage memory. The work area memory is used by the processor 116 when manipulating data. The storage memory is battery backed-up and is used to store the coupon, frequent shopper, cash card, and other information.

The tone generator 118 gives the customer auditory feedback about the operations they perform. Just as product scanners in stores beep when a product is scanned successfully, the coupon scanner 100 will provide an audible status for this and other conditions.

Figure 2:
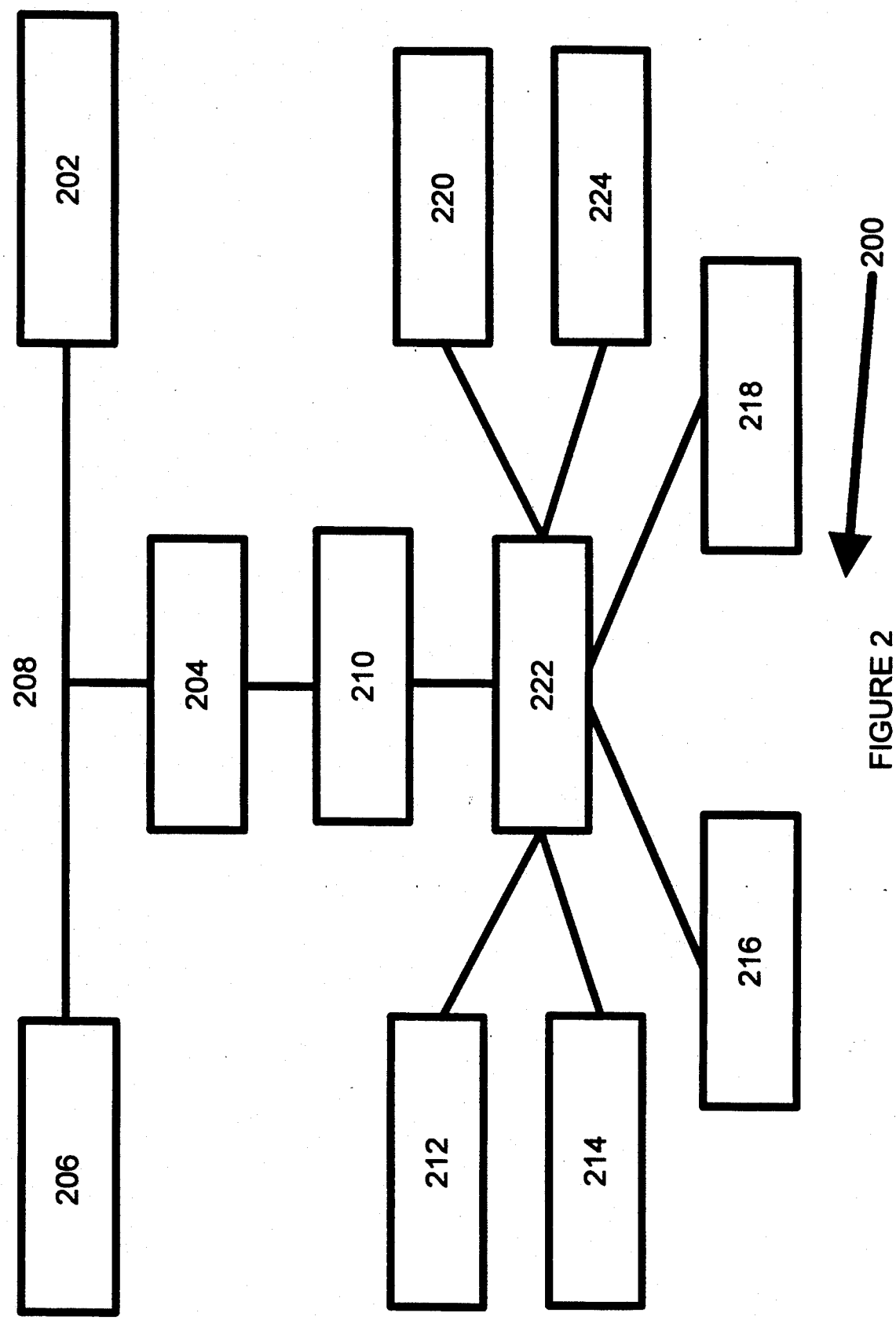
FIG. 2 is a block diagram of a store recorder according to the invention.
Figure 3:
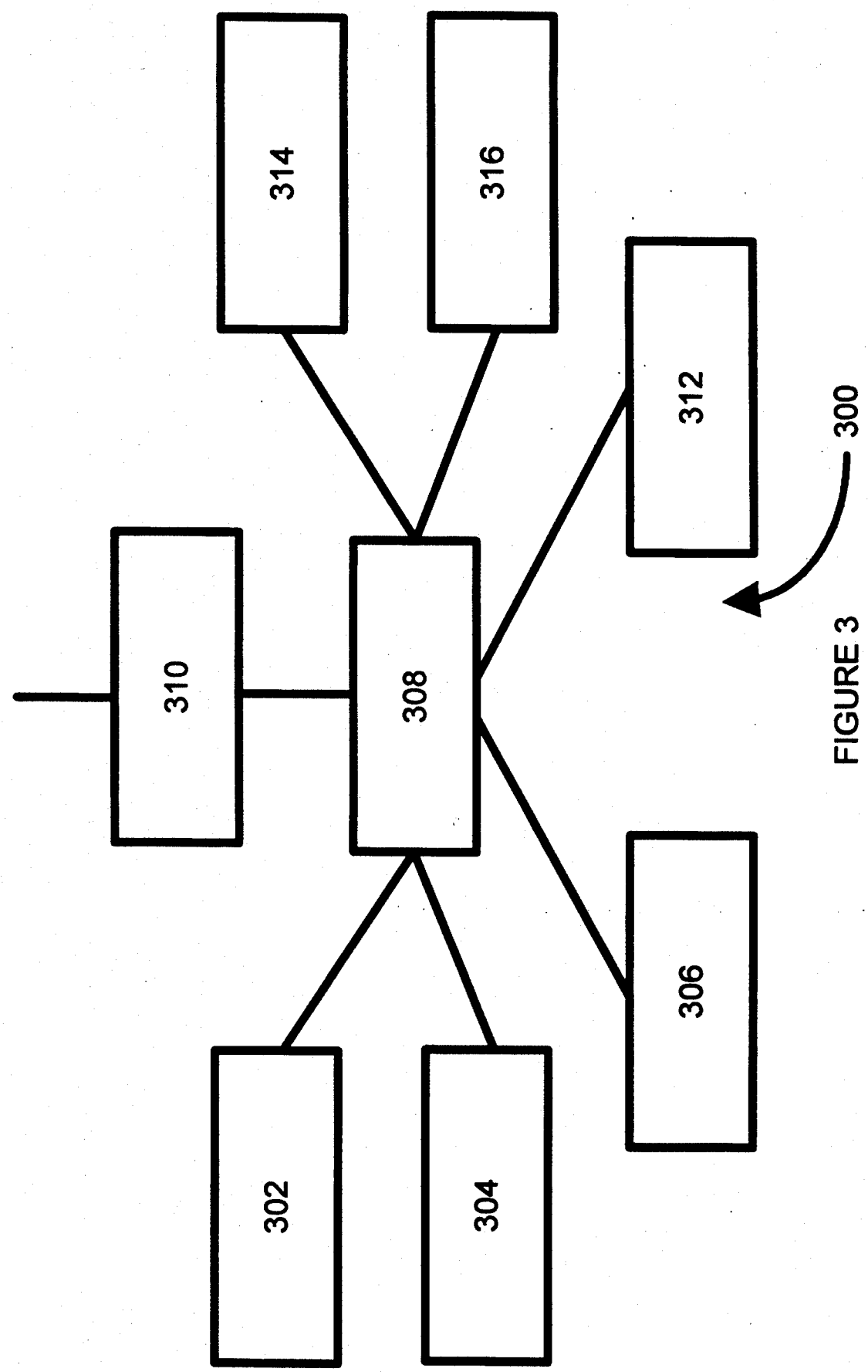
FIG. 3 is a block diagram of a store kiosk according to the invention.
Figure 4:
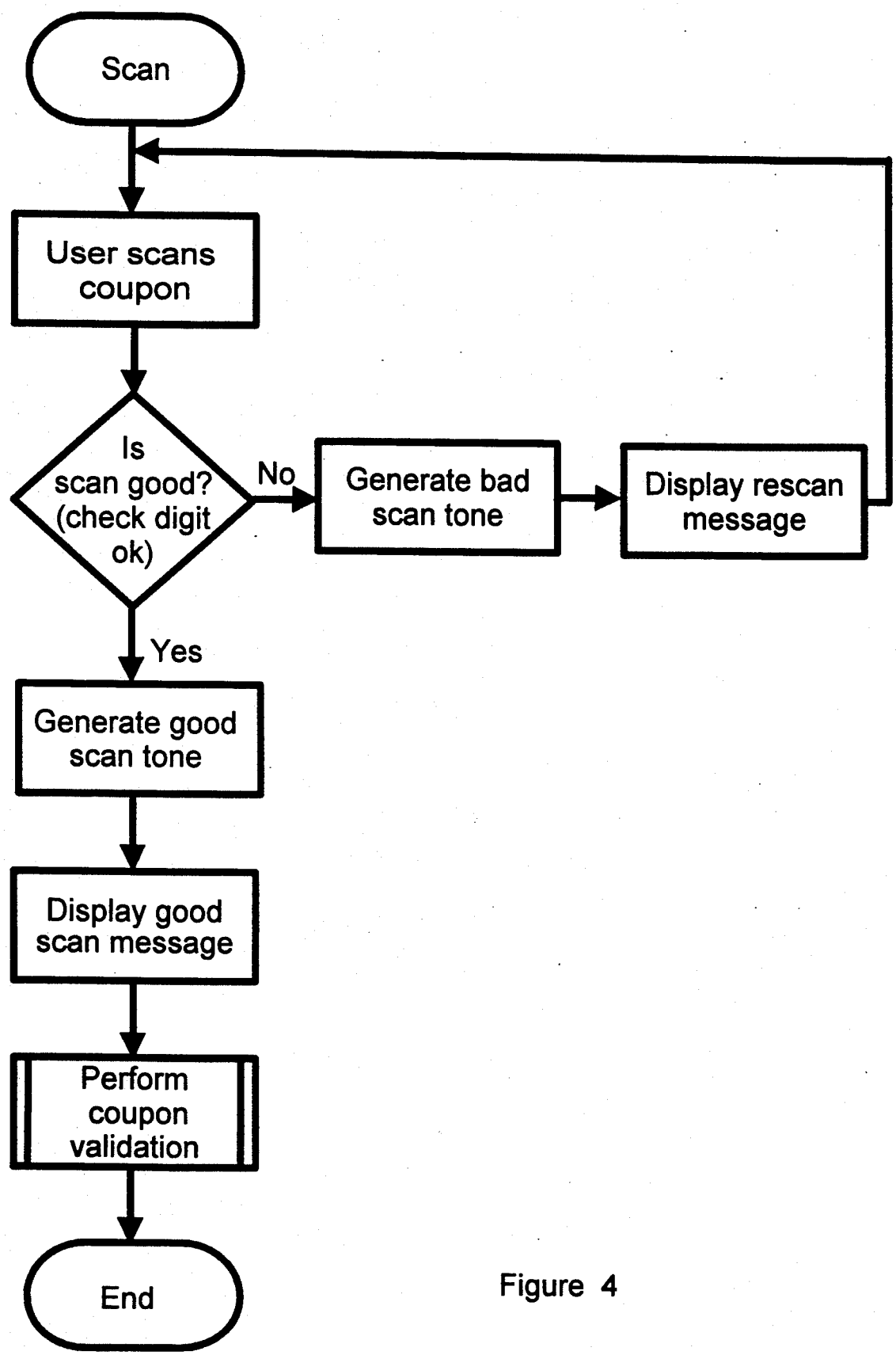
FIG. 4 is a flow chart of the operations performed by the hand-held coupon scanner of FIG. 1 while in the process of scanning a coupon.
Figure 5A:
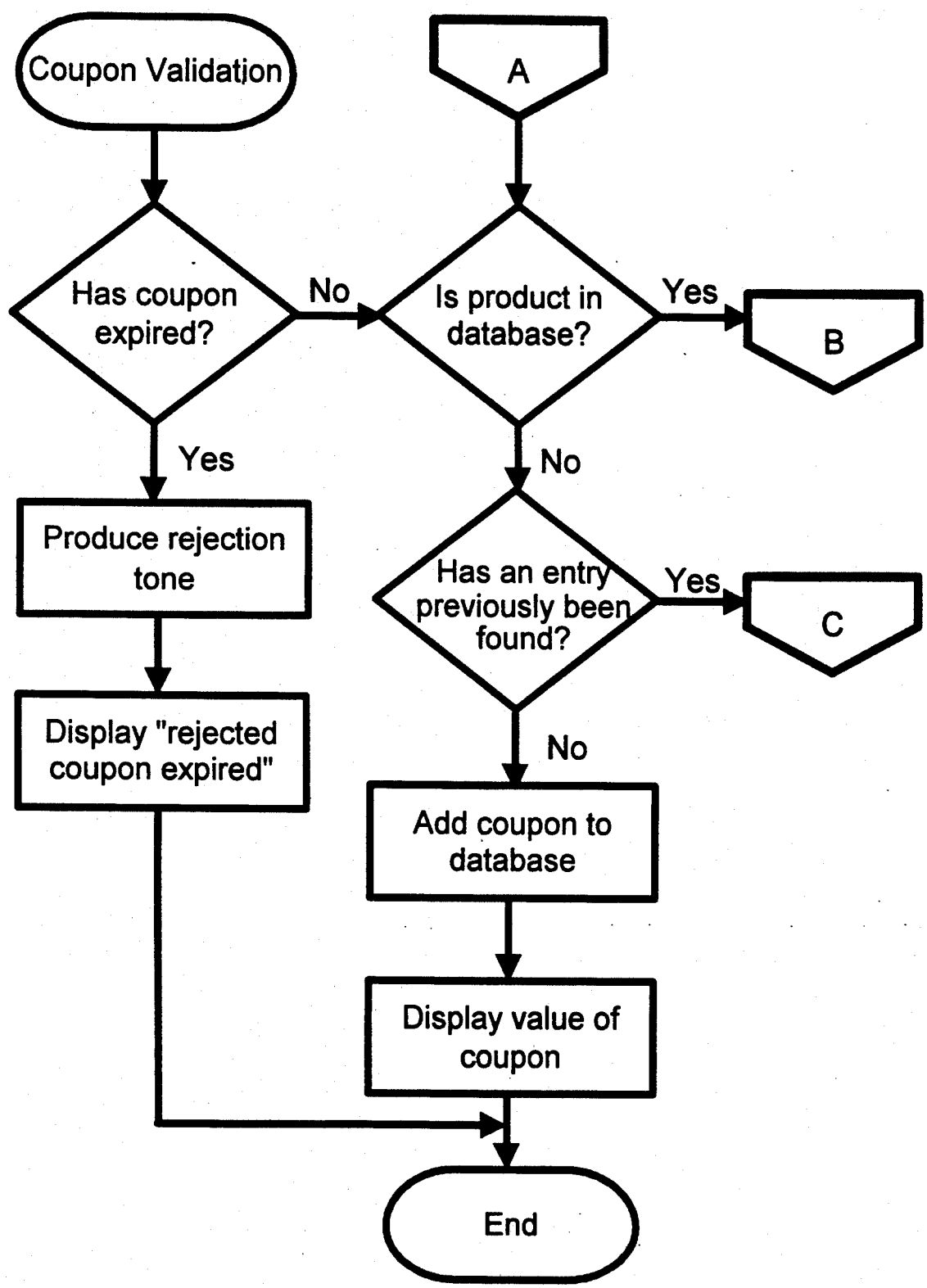
FIGS. 5A, 5B and 5C are a flow chart according to the invention of the operations performed by the store recorder of FIG. 2 in validating a coupon.
Figure 5B:
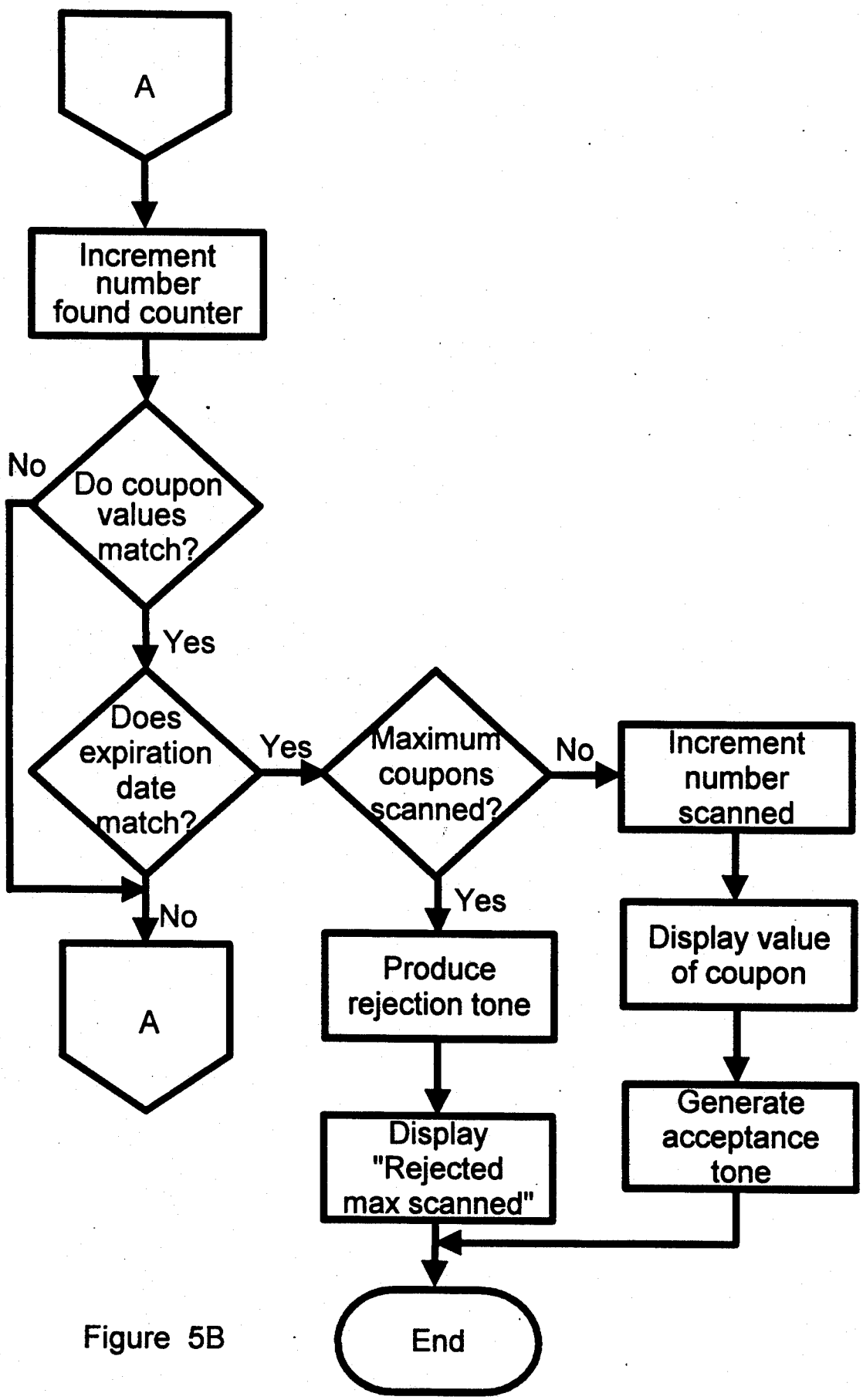
Figure 5C:
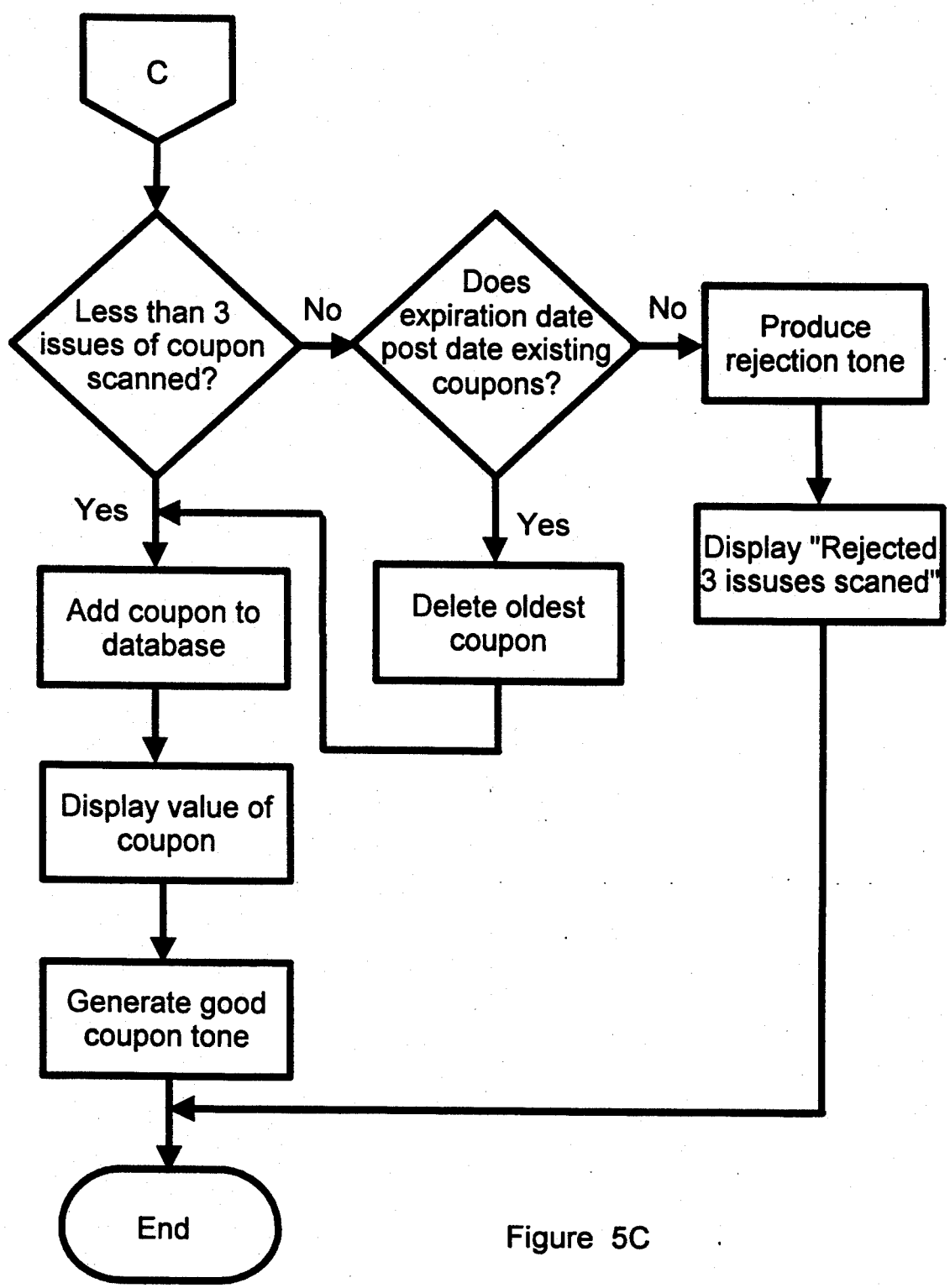
Figure 6:
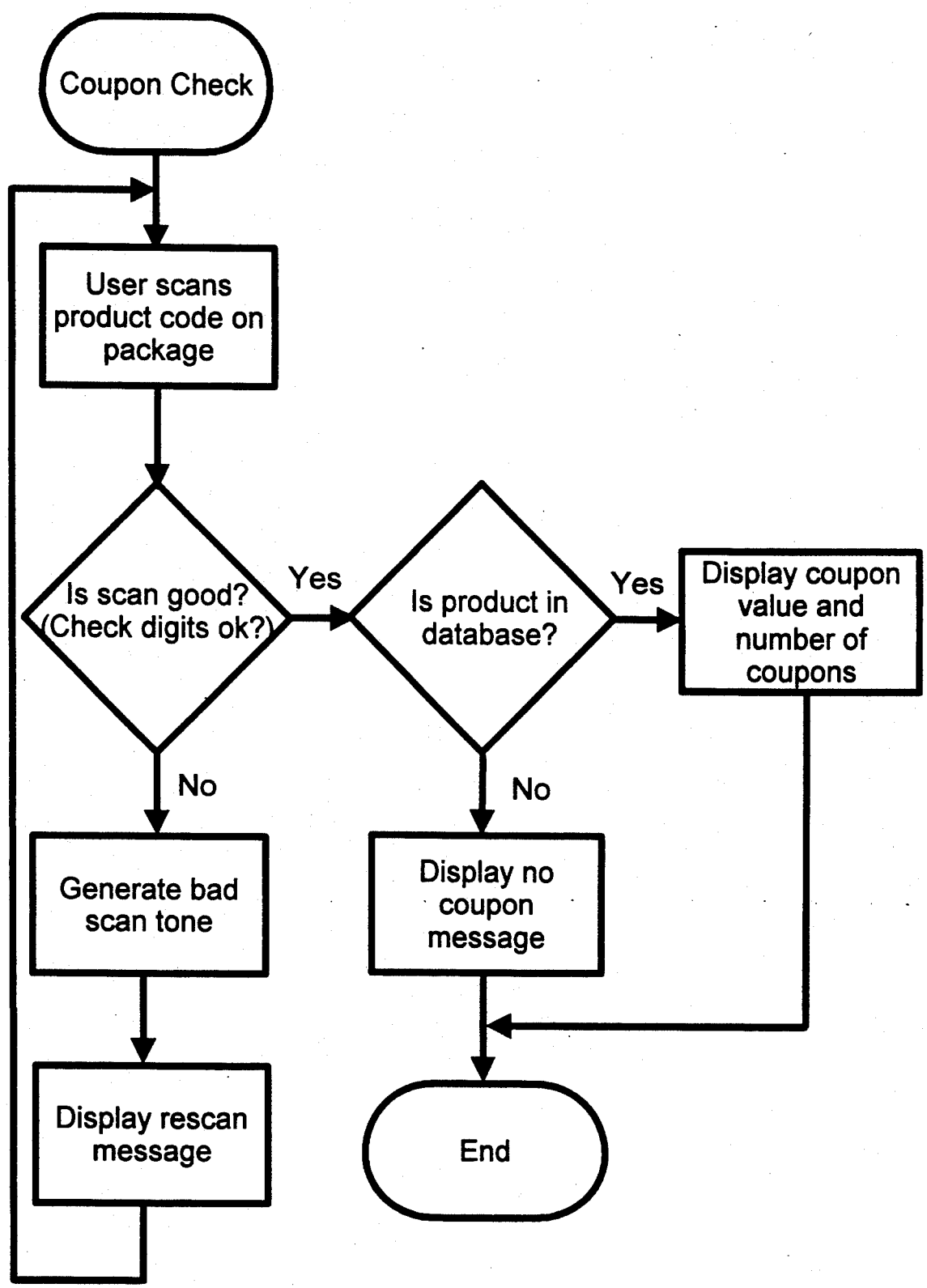
FIG. 6 is a flow chart according to the invention of the operations performed by the hand-held coupon scanner of FIG. 1 comparing a product code to the product codes previously stored in its memory.
Figure 7A:
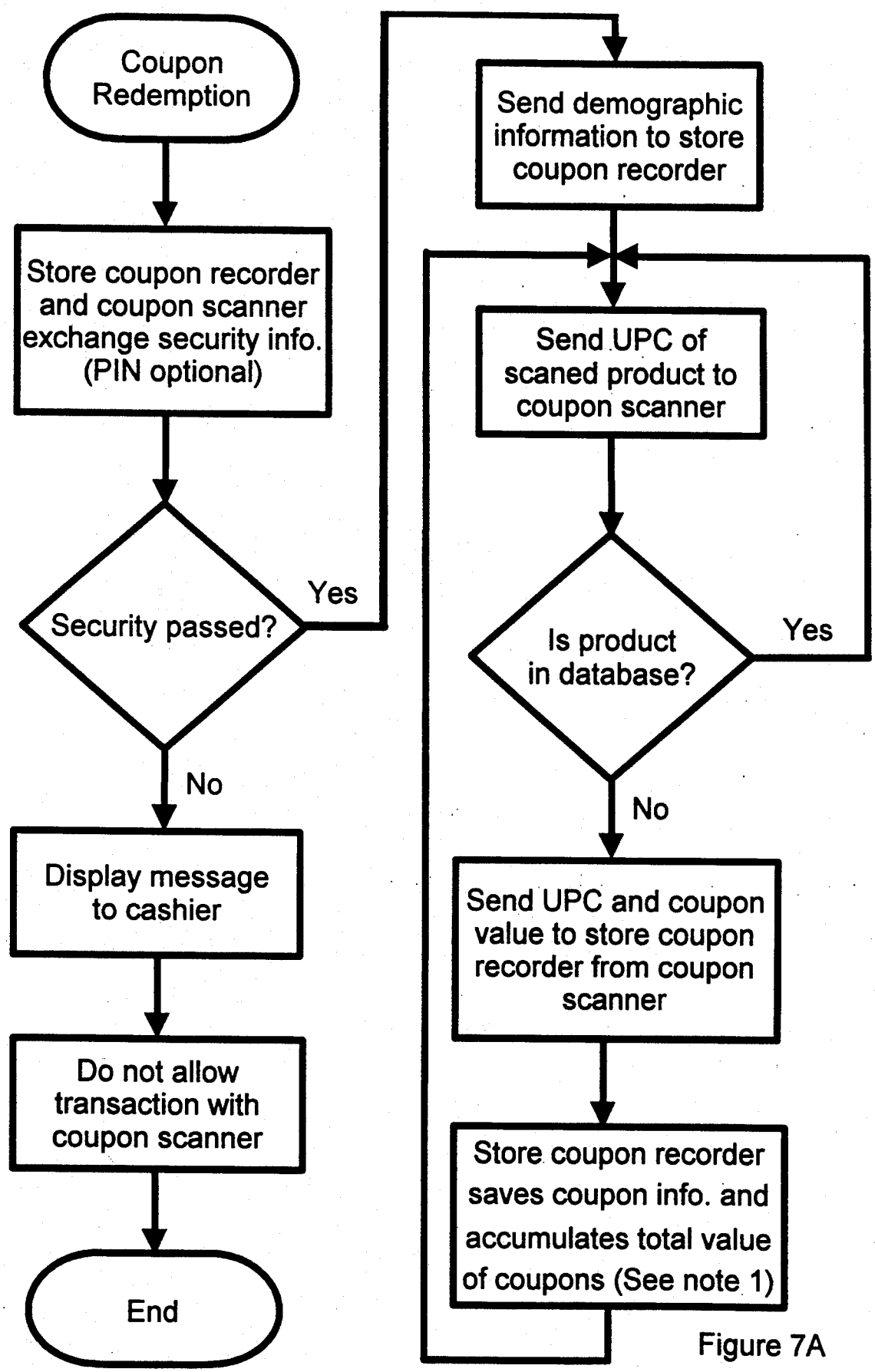
FIG. 7 is a flow chart according to the invention of the transaction of redeeming a coupon scanned into the hand-held coupon scanner of FIG. 1 after purchase of the product covered by the coupon as recorded in the store recorder.
Figure 7B:
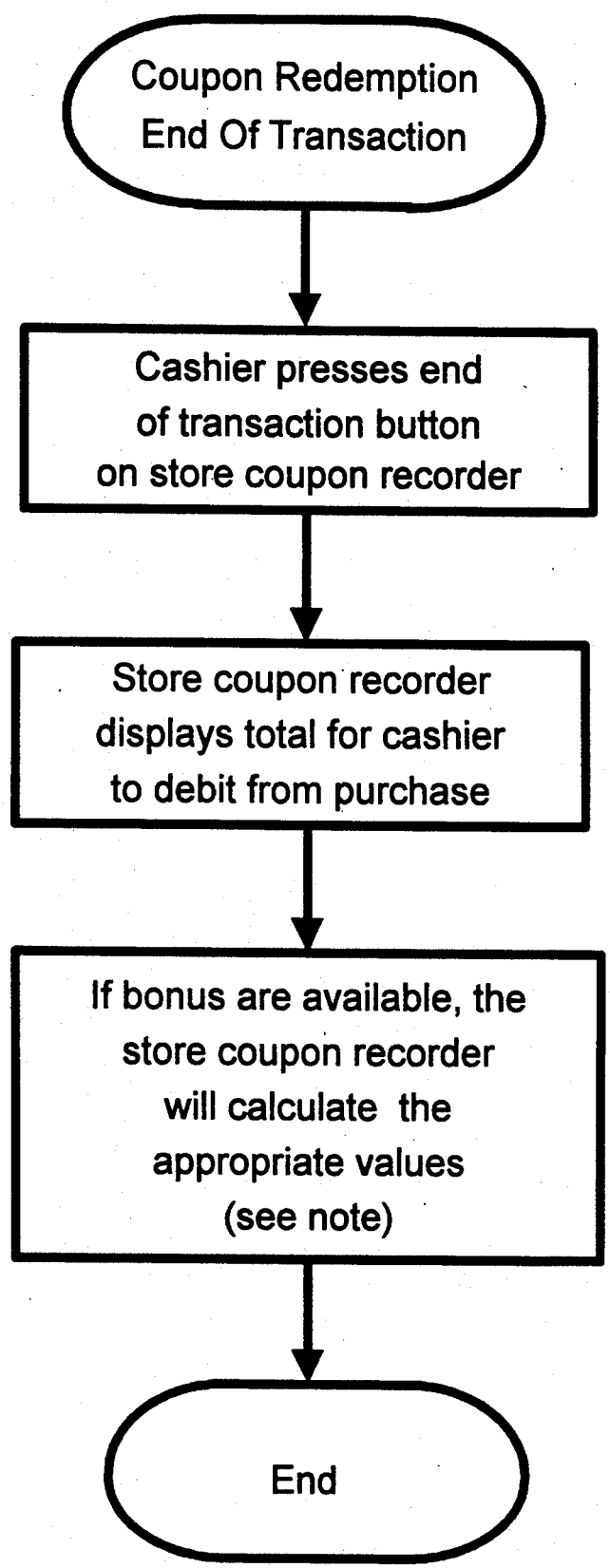

The 1/0 port 124 is used by the coupon scanner to communicate with the store coupon recorder of FIG. 2 and coupon kiosk of FIG. 3. The data transferred via 1/0 port 124 between the coupon scanner 100 and the store coupon recorder 200 includes product data to determine if a coupon exists for a scanned product; frequent shopper information such as the dollar value of the purchase and value of a bonus redemption; the value of coupons redeemed; cash values when used as a cash card; etc...

Communications between scanner 100 and coupon kiosk 300 support card operations that are not purchase oriented. These may include: frequent shopper redemptions that are not done at the checkout stand; checking frequent shopper totals; performing payment system transactions such as; adding money to the coupon scanner; checking the cash balance; requesting check approval; etc...

The coupon scanner 100 is smart and will only store in memory 110 data relating to unexpired coupons 102 which are being scanned. The coupon portion 108 includes an expiration date which is compared to the present date provided by clock 122. When a coupon is rejected, a third tone sounds and/or a different visual display will flash twice to alert the customer to read the liquid crystal display (LCD) 120 on the coupon scanner 100. The LCD 120 will display the specific reason why a coupon was rejected (e.g., 'Expired', 'Maximum scanned', etc..).

As will be described in detail below, at the checkout, the UPC of the product being purchased is compared with those stored on the coupon scanner 100. If a match is found, the coupon data is removed from the coupon scanner's memory 110. Alternatively, the customer who is trying to decide between two products on a shelf in a store can check to see if the coupon scanner 100 has a coupon stored therein for a product by scanning the product's UPC. If the product has a coupon in the scanner 100, then the coupon scanner's display will show the value of the coupon and the number of coupons scanned. If there is no coupon then the word 'NONE' is displayed.

Preferably, store coupon recorder 200 is a stand alone version which is not integrated into the electronic cash register 202 (ECR). This allows for use of the recorder 200 without the need to modify existing ECR 202 hardware. However, it is contemplated that recorder 200 may be an integral part of ECR 202.

Data line monitor 204 reads the scan data sent by checkout-stand scanner 206 and allows the data to pass unaltered to the ECR 202 via data line 208. This data will be compared to the coupon data in the coupon scanner. Optional decoder 210 is only necessary in systems where the checkout-stand scanner 206 does not decode the data before transmission.

Recorder 200 includes a two-line LCD display 212. The display 212 is used to provide information to the checkout clerk such as the total dollar amount of all of the coupons used. In an integrated coupon scanner - ECR system, this data would be directly transmitted between the two devices and could be displayed at the ECR 202.

The keypad 214 is used to enter data such as the purchase amount for frequent shopper benefits, or customer originated data such as a PIN for cash card purchases and check guarantee operations. In an integrated coupon scanner - ECR system, this data would be directly transmitted between the two devices.

The network port 216 is used in multi-check stand stores so that the individual store coupon recorders 200 can transmit their data for collection to a central host.

The printer port 218 can be used to print lists of coupons redeemed, endorsements on checks, receipts, special frequent shopper coupons, or any other data of the system.

The store coupon recorder has two types of memory 220; work area memory, and storage memory. The work area memory is used by the processor 222 when manipulating data. The storage memory is battery backed-up and is used to keep transaction information.

The scanner port 224 is used by the store coupon recorder to communicate with the coupon scanner 100. The data transmitted over the scanner port 224 via 1/0 port 124 between the coupon scanner 100 and the recorder 200 includes product data to determine if a coupon exists for a scanned product; frequent shopper information such as the dollar value of the purchase and value of a bonus redemption; the value of coupons redeemed; cash values when used as a payment system; and any other data needing checking or coordination.

The store coupon recorder 200 compares the UPC of each product being purchased with those initially stored on the coupon scanner 100, and subsequently transferred to memory 220 of recorder 200. If a match is found, the store coupon recorder 200 writes an updated record to the coupon scanner's memory. Alternately, recorder could send a command to the coupon scanner 100 via the scanner port 224 and 1/0 port 124 which causes the entry to update.

The UPC of each product purchased, expiration date of the coupon, and the dollar amount of the coupon are saved to a database on the store coupon recorder 200. In addition, the dollar amount of the coupon is run through any equation the store may have as a promotion to add value to a coupon.

EXAMPLE

Value of coupon = 2 * dollar amounts < $0.50 or face value.

The total coupon value is accumulated. At the end of the customer transaction the total value is displayed by display 212 and the clerk deducts this from the bill. The store coupon recorder 200 can, as an option, print a receipt for the customer of the product name and coupon amount.

If more than one version of the coupon resides on the coupon scanner 100, the coupon with the earliest expiration date is used. If there is no difference in expiration dates, then the largest dollar value coupon is used.

If the store participates in a frequent shopper program, the clerk would enter the amount of the purchase on the store coupon recorder's keypad 214 and the appropriate bonus would be added to the coupon scanner 100 via scanner port 224 and 1/0 port 124.

Coupon kiosk 300 as illustrated in FIG. 3 resembles a small automatic teller machine (ATM). Display 302 is a small cathode ray tube (CRT) or LCD display such as those used in lap top computers. Keypad 304 is used to request a variety of functions from the coupon kiosk 300. Coupon kiosk 300 serves as a host to the store coupon recorders 200 in a multi-check stand store, collecting the coupon data over the network port 306.

Processor 308 controls all of the functions of the Store Coupon recorder. The modem 310 is used to communicate with banks and the coupon manufacturer. The printer port 312 can be used to print endorsements on checks, special frequent shopper coupons, or other features. The kiosk 300 has two types of memory 314: work area memory, and storage memory. The work area memory is used by the processor 308 when manipulating data. The storage memory is battery backed-up and is used to keep transaction information.

The scanner port 316 is used by the coupon kiosk 300 to communicate with the coupon scanner 100 via 1/0 port 124. The data transmitted over the scanner port 316 between the coupon kiosk 300 and the coupon scanner 100 are financial and frequent shopper bonus data.

The UPC 104 will be extended as shown in FIG. 1 to provide a coupon code 108 in addition to the product code 106. The coupon code 108 provides:
 1. the dollar value of the coupon
 2. the expiration date of the coupon
 3. the maximum number of times the coupon can be scanned; and
 4. the issue date of the coupon If an expiration date is not specified, a default expiration date of six months after the issue date may be used. This is done to avoid having 'dead' coupons in the coupon scanner's database. A dead coupon is an entry where the maximum number was scanned, all the coupons have been used, and the expiration date has not been reached yet.

Scanning a New Coupon

When the coupon is scanned by scanner 100, the coupon scanner database 110 is searched for the UPC. If the UPC is found, the dollar value of the coupon and the expiration date of the coupon are compared with those found in the database. If either of these fields does not match, then the coupon is deemed to be a new coupon. The UPC, dollar value, expiration date, and maximum number of scans are saved to the database. The number of these particular coupons in the database and the total number of times this coupon has been scanned are initialized to one. Preferably, three different versions of a coupon can exist in the database. When three different versions of a coupon exist and a fourth is being scanned, one of the existing versions will be replaced by the new version if: 1) the expiration date of the new coupon post dates that of an existing one, or 2) the dollar value of the new coupon is greater.

When scanning a Pre-existing Coupon, the UPC, dollar value, and expiration date of the coupon being scanned will match one already on the coupon scanner database. If the total number of times this coupon has been scanned equals the maximum number of times the coupon can be scanned then the coupon will not be recorded. A tone will sound and the light will flash twice to alert the customer to read the LCD display on the coupon scanner. The LCD will display 'Maximum scanned'. Each UPC is limited to three separate entries in the database.

When the customer redeems all of a particular coupon, the coupon entry will remain in the database until its expiration date. The entry will be removed when it expires or when it can be replaced as described above. This safeguards against a coupon being scanned the maximum number of times, and then scanned again after all of the coupons from the initial scan have been used.

The kiosk 300 of FIG. 3 may be used in stores that have either a frequent shopper bonus program which is not executed at the checkout stand, or which use the coupon scanner as a payment system also. The kiosk 300 is located in the customer service area of a store.

Alternatively, the customer can use the kiosk 300 to participate in frequent shopper bonus programs. The store may wish to use the frequent shopper program to promote slow moving or new merchandise. One method of doing this would have the customer insert their coupon scanner 100 in the coupon kiosk 300. The coupon kiosk 300 would present them with a list of products that they could receive for the number of bonus points they have accumulated. After choosing a product, the coupon kiosk 300 would insert into their coupon scanner a coupon for the product which would be redeemed at the check stand.

To employ the coupon scanner 100 as a payment system, the customer would use the coupon kiosk 300 to access their bank account(s) to transfer cash between the bank account and the coupon scanner 100. For check authorization, the customer who requests check cashing privileges is given a dollar and number of checks limit for each type of check they wish to cash. When a customer cashes a check these limits are examined and the check is approved if it falls within these limits. If the check is above the dollar limit it can only be approved and guaranteed to the remaining dollar limit. If the maximum number of checks have been cashed then the check is not approved/guaranteed. These functions would require verification, validation, and encryption security methods.

As a result, the electronic coupon system eliminates the handling of paper coupons and the bookkeeping that goes along with them. The customer would no longer need to clip, sort, and search through hundreds of coupons. The merchant would have an electronic record of the coupons redeemed. This record can be sorted and transmitted for quicker payment at greatly reduced handling costs. The merchant benefits as well from a speedier transaction at the checkout stand. The merchant also gains customer loyalty to the bonus program that they offer. The manufacturer who issued the coupon would have reduced handling costs and, due to reduced processing time, quicker feed-back about the efficacy of their coupons. The reduction in coupon fraud could provide a significant savings.

In summary, the system would be used in the following manner. The customer would choose the coupons 102 they wish to use just as they do today, from newspapers, mailers, product wrappers, etc.. However, rather than cutting out, sorting, and storing the coupon 102, the customer would scan the extended bar code 104 on the coupon 102 with a hand-held coupon scanner 100. The coupon would be entered in a coupon database memory 110 of the coupon scanner 100. While shopping, the customer could have a print-out of coupons in the scanner by connecting the 1/0 port 124 to a printer or could check to determine if the scanner has in its memory 110 a coupon for a particular product by scanning the product bar code.

At the checkout-stand the customer would hand their coupon scanner 100 to the checker. Before scanning and checking out the customers products, the checker would connect the scanner 100 via 1/0 port 124 to the scanner port of coupon recorder 200 which, during the checkout process would verify that the coupon's product has been purchased, deduct the coupon from the coupon scanner 100, record the coupon in its database memory for redemption, and display the savings to the customer. Connecting to the coupon recorder 200 before scanning and checking out the customer's products speeds up the redemption process by allowing concurrent check-out and coupon search.

What is claimed is:

1. A coupon redemption system for redeeming product coupons having a first set of data thereon, said first set of data being in a machine readable format and comprising coupon value, expiration date, and product identification, said system comprising:

personal coupon scanner means for use by a purchaser of products for scanning, decoding, and storing said first set of data, and also having a display means associated therewith for displaying scanned and stored information contained in said coupon scanner, said personal coupon scanner means being a self contained remote handheld device adapted to be carried by said purchaser of product and used to record coupon information obtained from advertising media at locations remote from a purchasing location;

register means located at a product purchase location for scanning and tallying a second set of data, said second set of data comprising product identification data corresponding to product selected for purchase by said purchaser of product;

recorder means for connecting to said coupon scanner and said register means for comparing said first set of data to said second set of data and accumulating a tallied value of correspondence between said sets of data for redemption of said tallied value against said product selected for purchase; and kiosk means providing a central in-store database for accumulating from all the recorder means connected in the system the tally of correspondence of said first and second sets of data.

2. A system as in claim 1, wherein said recorder means further comprising:

means for updating the coupon data in the coupon scanner to reflect a coupon redemption; a crediting means for assigning and remitting bonuses and updating bonus information in said coupon scanner; a means for comparing and accumulating a tally of correspondence between said first and second sets of data and, display means for displaying such information to said purchaser.

3. A system as in claim 1, wherein said kiosk means further comprises:

second recorder means for providing additional interfacing with the coupon scanner for providing to the coupon scanner additional data and for providing to the kiosk information stored in the coupon scanner.

* * * * *